US009639596B2

(12) United States Patent
Ivanova et al.

(10) Patent No.: US 9,639,596 B2
(45) Date of Patent: May 2, 2017

(54) PROCESSING DATA IN A DATA WAREHOUSE

(71) Applicant: International Business Machines Corporation, Armonk, NY (US)

(72) Inventors: Iliyana P. Ivanova, Boblingen (DE); Christoph Lingenfelder, Herrenberg (DE); Christoph H. Sieb, Schriesheim (DE); Simone Zerfass, Vaihingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/879,222

(22) Filed: Oct. 9, 2015

(65) Prior Publication Data

US 2016/0034552 A1    Feb. 4, 2016

Related U.S. Application Data

(62) Division of application No. 13/705,901, filed on Dec. 5, 2012, now Pat. No. 9,235,633.

(30) Foreign Application Priority Data

Dec. 6, 2011    (EP) .................................... 11192059

(51) Int. Cl.
*G06F 17/30*    (2006.01)

(52) U.S. Cl.
CPC .. *G06F 17/30592* (2013.01); *G06F 17/30333* (2013.01); *G06F 17/30398* (2013.01); *G06F 17/30563* (2013.01); *G06F 17/30598* (2013.01); *G06F 17/30867* (2013.01)

(58) Field of Classification Search
CPC ................................................ G06F 17/30867
USPC .................................................. 707/600, 754
See application file for complete search history.

(56) References Cited

U.S. PATENT DOCUMENTS

| 7,831,539 B2 | 11/2010 | Folting et al. |
| 2006/0287998 A1* | 12/2006 | Folting ............. G06F 17/30489 |
| 2011/0087954 A1 | 4/2011 | Dickerman et al. |

OTHER PUBLICATIONS

U.S. Appl. No. 13/705,901; Non-Final Office Action; Date Filed: Dec. 15, 2012; Date Mailed: Jan. 28, 2015; 13 pages.

* cited by examiner

*Primary Examiner* — Joshua Bullock
(74) *Attorney, Agent, or Firm* — Cantor Colburn LLP

(57) ABSTRACT

Processing data of a data warehouse is provided and includes receiving, by a processing device, user input to create simple filter objects. Each filter object defines an ad hoc subset of a respective dimension of a dimension table of the data warehouse. User input is received to create a filtered operation object that specifies an operation and a plurality of the simple filter objects. The ad hoc subset differs from all subsets defined in the dimension table.

10 Claims, 15 Drawing Sheets

FIG 5

| □ RESULT_TABLE |
|---|
| 🔑 STORE_ID |
| ◻ SUM_REVENUE_SASUWEEKPROMO |
| ◻ SUM_REVENUE_SASUWEEKAFTER |
| ◻ SUM_REVENUE_SASUWEEKBEFORE |
| ◻ SUM_REVENUE_SASUWEEKPROMO_PROMOPRODUCTS |
| ◻ SUM_REVENUE_SASUWEEKAFTER_PROMOPRODUCTS |
| ◻ SUM_REVENUE_SASUWEEKBEFORE_PROMOPRODUCTS |
| ◻ COUNT_SALES_SLIP_ID_SASUWEEKPROMO |
| ◻ COUNT_SALES_SLIP_ID_SASUWEEKAFTER |
| ◻ COUNT_SALES_SLIP_ID_SASUWEEKBEFORE |
| ◻ COUNT_SALES_SLIP_ID_SASUWEEKPROMO_PROMOPRODUCTS |
| ◻ COUNT_SALES_SLIP_ID_SASUWEEKAFTER_PROMOPRODUCTS |
| ◻ COUNT_SALES_SLIP_ID_SASUWEEKBEFORE_PROMOPRODUCTS |
| ◻ SUM_NUMBER_OF_ITEMS_SASUWEEKPROMO |
| ◻ SUM_NUMBER_OF_ITEMS_SASUWEEKAFTER |
| ◻ SUM_NUMBER_OF_ITEMS_SASUWEEKBEFORE |
| ◻ SUM_NUMBER_OF_ITEMS_SASUWEEKPROMO_PROMOPRODUCTS |
| ◻ SUM_NUMBER_OF_ITEMS_SASUWEEKAFTER_PROMOPRODUCTS |
| ◻ SUM_NUMBER_OF_ITEMS_SASUWEEKBEFORE_PROMOPRODUCTS |

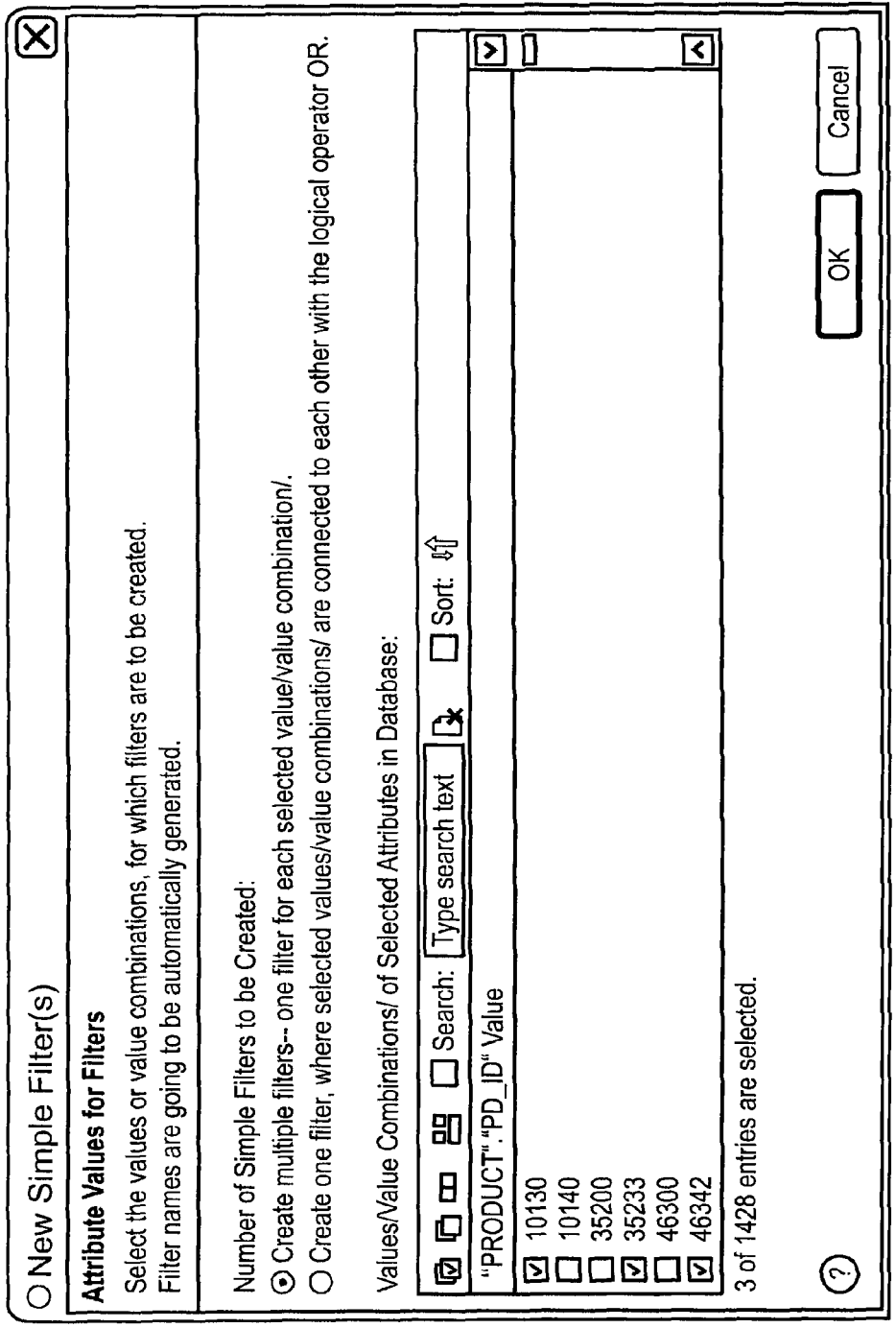

FIG 11b

New Compound Filter Group

Compound Filters

Select the compound filters to be created for the group.

Compound Filters:

| Filter from "TIME filter group" | Filter from "PRODUCT filter group" | Compound Filter Name |
|---|---|---|
| ☑ SaSuWeekPromo | PromoProducts | SaSuWeekPromo-PromoProducts |
| ☑ SaSuWeekAfter | PromoProducts | SaSuWeekAfter-PromoProducts |
| ☑ SaSuWeekBefore | PromoProducts | SaSuWeekBefore-PromoProducts |

[< Back] [Next >] [Finish] [Cancel]

FIG 12b

○ New Filtered Aggregation Group      _ ▢ ✕

Filtered Aggregations
Select the filtered aggregations for the group.

Filtered Aggregations:

| | Aggregation | Simple or Compound Filter | Filtered Aggregation Name |
|---|---|---|---|
| ▷ | SUM_REVENUE | SaSuWeekPromo | SUM_REVENUE-SaSuWeekPromo |
| ▷ | SUM_REVENUE | SaSuWeekAfter | SUM_REVENUE-SaSuWeekAfter |
| ▷ | SUM_REVENUE | SaSuWeekBefore | SUM_REVENUE-SaSuWeekBefore |
| ▷ | SUM_REVENUE | SaSuWeekPromo-PromoProducts | SUM_REVENUE-SaSuWeekPromo-PromoProducts |
| ▷ | SUM_REVENUE | SaSuWeekAfter-PromoProducts | SUM_REVENUE-SaSuWeekAfter-PromoProducts |
| ▷ | SUM_REVENUE | SaSuWeekBefore-PromoProducts | SUM_REVENUE-SaSuWeekBefore-PromoProducts |
| ▷ | COUNT_SALES_SLIP_ID | SaSuWeekPromo | COUNT_SALES_SLIP_ID-SaSuWeekPromo |
| ▷ | COUNT_SALES_SLIP_ID | SaSuWeekAfter | COUNT_SALES_SLIP_ID-SaSuWeekAfter |
| ▷ | COUNT_SALES_SLIP_ID | SaSuWeekBefore | COUNT_SALES_SLIP_ID-SaSuWeekBefore |
| ▷ | COUNT_SALES_SLIP_ID | SaSuWeekPromo-PromoProducts | COUNT_SALES_SLIP_ID-SaSuWeekPromo-PromoProducts |
| ▷ | COUNT_SALES_SLIP_ID | SaSuWeekAfter-PromoProducts | COUNT_SALES_SLIP_ID-SaSuWeekAfter-PromoProducts |
| ▷ | COUNT_SALES_SLIP_ID | SaSuWeekBefore-PromoProducts | COUNT_SALES_SLIP_ID-SaSuWeekBefore-PromoProducts |
| ▷ | SUM_NUMBER_OF_ITEMS | SaSuWeekPromo | SUM_NUMBER_OF_ITEMS-SaSuWeekPromo |
| ▷ | SUM_NUMBER_OF_ITEMS | SaSuWeekAfter | SUM_NUMBER_OF_ITEMS-SaSuWeekAfter |
| ▷ | SUM_NUMBER_OF_ITEMS | SaSuWeekBefore | SUM_NUMBER_OF_ITEMS-SaSuWeekBefore |
| ▷ | SUM_NUMBER_OF_ITEMS | SaSuWeekPromo-PromoProducts | SUM_NUMBER_OF_ITEMS-SaSuWeekPromo-PromoProducts |
| ▷ | SUM_NUMBER_OF_ITEMS | SaSuWeekAfter-PromoProducts | SUM_NUMBER_OF_ITEMS-SaSuWeekAfter-PromoProducts |
| ▷ | SUM_NUMBER_OF_ITEMS | SaSuWeekBefore-PromoProducts | SUM_NUMBER_OF_ITEMS-SaSuWeekBefore-PromoProducts |

⊙          [ < Back ] [ Next > ]    [ Finish ] [ Cancel ]

PROCESSING DATA IN A DATA WAREHOUSE

PRIORITY

This application is a divisional application of U.S. Ser. No. 13/705,901 filed Dec. 5, 2012 which claims the benefit to European Patent Application No. 11192059.1 filed on Dec. 6, 2011, and all the benefits accruing therefrom under 35 U.S.C. §119, the contents of which in their entirety are herein incorporated by reference.

BACKGROUND

The present invention relates generally to processing data in a data warehouse, and more specifically, to a method and system that allows a user to perform operations on subsets of data that are not defined by the structure of the data warehouse.

Contemporary database environments store and manage data, such as the sale and inventory of products sold by a retailer. Such a database environment may include a data storage system responsible for storing the data, with data encryption, data redundancy, backup facilities, data compression, or the like, as specified by an administrator. Similarly, the database environment may include a user interface that allows one or more users to access and process the data in the data storage system in a meaningful way (e.g., for preparing sales reports, inventory reports, etc.).

The representation of data displayed to a user may differ significantly from the logical or physical representation of the same data elsewhere within the database environment. The database environment thus serves, on the one hand, to store the data in an efficient and secure manner and, on the other hand, to process and present the data to a user in a meaningful way without overly encumbering the user.

Database environments typically include one or more data tables, i.e., logical arrays of data, with each data table containing a plurality of identically structured records. For example, in a data table relating to sales transaction data, the data table may include a plurality of rows, with each row containing the data associated with an individual record, for example, an individual sales transaction. In such cases, a row of data is synonymous with a record of data. Each column of the data table typically contains data relating to an aspect of a record. In the given example, each column contains data relating to an aspect of the respective sales transaction, for example, the date of the transaction, the time of the transaction, the location, the sold product, the sales price, etc. In cases where the data in a particular column is selected from a limited set of values, where the set of values is defined in the database environment (e.g., a set of product identification codes or date identification codes), the column and the data therein is typically termed a "dimension." In cases where the data in a particular column is selected from an essentially continuous range of values (e.g., a sales price), the column and the data therein is typically termed a "measure." Typically, the database environment will comprise a plurality of data tables, each relating to a different type of data, such as sales transactions, inventory, customers, etc.

SUMMARY

According to an embodiment, a computer-implemented method is provided for processing, by a processing device, data of a database environment. The data of a database environment includes hierarchy information and a matrix of values. The hierarchy information includes at least two sets of identification codes and defines at least two groups of identification codes. Each identification code of any respective one of the groups belongs to a respective one of the sets of identification codes. The matrix of values includes at least two columns of identification values, each identification value of each respective one of the columns of identification values belonging to a respective one of the sets of identification codes. At least one simple filter object is generated based on a respective user input, each simple filter object defining an ad hoc group of identification codes selected from a respective one of the sets of identification codes. A filtered operation object that specifies an operation and at least one of the simple filter objects is generated based on a user input, wherein each of the ad hoc groups differs from each of the groups defined by the hierarchy information.

According to another embodiment, a computer-implemented method of processing data of a data warehouse is provided for receiving, by a processing device, user input to create simple filter objects. Each filter object defines an ad hoc subset of a respective dimension of a dimension table of the data warehouse. User input is received to create a filtered operation object that specifies an operation and a plurality of the simple filter objects. The ad hoc subset differs from all subsets defined in the dimension table.

According to another embodiment, a system is provided for processing data of a data warehouse. The system includes a memory having computer readable instructions and a processor for executing the computer readable instructions. The system also includes a user input receiving component, a simple filter object creation component, and a filtered operation object creation component. The simple filter object creation component, based on user input received by the user input receiving component, creates simple filter objects. Each simple filter object defines an ad hoc subset of a respective dimension of a dimension table of the data warehouse. The filtered operation object creation component, based on a user input received by the user input receiving component, creates a filtered operation object. The filtered operation object specifies an operation and a plurality of the simple filter objects, wherein the ad hoc subset differs from all subsets defined in the dimension table.

According to another embodiment, a computer program product that includes a computer readable storage medium having program code embodied therewith is provided. The program code is executable by a processor for processing data of a database environment. The data of a database includes hierarchy information and a matrix of values. The hierarchy information includes at least two sets of identification codes and defines at least two groups of identification codes. Each identification code of any respective one of the groups belongs to a respective one of the sets of identification codes. The matrix of values includes at least two columns of identification values, each identification value of each respective one of the columns of identification values belongs to a respective one of the sets of identification codes. At least one simple filter object is generated based on a respective user input. Each simple filter object defines an ad hoc group of identification codes selected from a respective one of the sets of identification codes. A filtered operation object that specifies an operation and at least one of the simple filter objects is generated based on a user input, where each of the ad hoc groups differs from each of the groups defined by said hierarchy information.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 5 schematically shows a result table of the exemplary data processing scenario shown in FIG. 4 in accordance with an embodiment;

FIGS. 7 to 9 schematically show, based on the exemplary data processing scenario shown in FIG. 4, additional mocked-up screenshots of the user interface of a system for data processing shown in FIG. 6 in accordance with an embodiment;

FIGS. 11a to 11b schematically show, based on the exemplary data processing scenario shown in FIG. 4, additional mocked-up screenshots of the user interface of a system for data processing shown in FIG. 6 in accordance with an embodiment; and FIGS. 12a to 12b schematically show, based on the exemplary data processing scenario shown in FIG. 4, additional mocked-up screenshots of the user interface of a system for data processing shown in FIG. 6 in accordance with an embodiment.

DETAILED DESCRIPTION

Embodiments disclosed herein provide a method and system that allows a user to perform operations on subsets of data in a data warehouse that are not defined by the structure (i.e., existing hierarchies) of the data warehouse. Since the creation of such subsets is not dependent on the existence of corresponding structures within the data warehouse, or in other words, since the subsets can be created "on the fly" without reprogramming or restructuring the data warehouse, the subsets can be created for infrequent, specialized tasks. The term "ad hoc" is used to designate these subsets throughout the disclosure.

Figure 1:
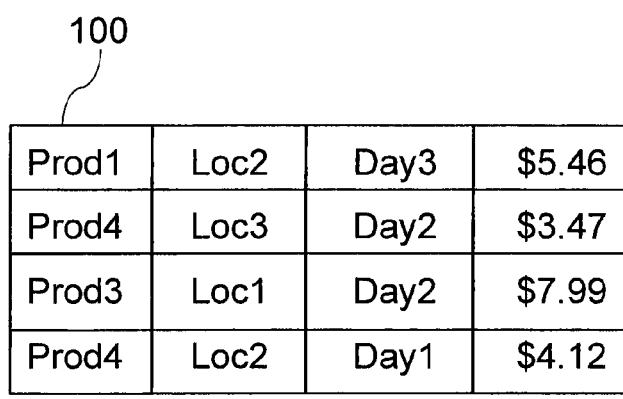
FIG. 1 schematically shows a data table in accordance with an embodiment.

FIG. 1 schematically shows an embodiment of a data table 100 in accordance with an embodiment.

In the illustrated embodiment, data table 100 includes a plurality of values arranged in a matrix, i.e., arranged in rows and columns. Although data table 100 is shown as including just four columns and four rows, a data table in accordance with an embodiment may include any number of columns and rows.

In the illustrated embodiment, data table 100 includes a column containing product identification codes, namely Prod1, Prod4, Prod3 and (again) Prod4. Data table 100 also includes a column containing location identification codes, namely Loc2, Loc3, Loc1 and (again) Loc2. Data table 100 also includes a column containing date identification codes, namely Day3, Day2, (again) Day2 and Day1. Data table 100 is also shown as including a column of "price" measures, namely $5.46, $3.47, $7.99 and $4.12. Each of the rows in data table 100 may be representative of an individual sales transaction. For example, the uppermost row of data table 100 may represent a sale of the product associated with product identification code Prod1 at the store location associated with location identification code Loc2 on the day associated with date identification code Day3 for a price of $5.46. The lowermost row of data table 100 may represent a sale of the product associated with product identification code Prod4 at the store location associated with location identification code Loc2 on the day associated with date identification code Day1 for a price of $4.12. The sale of the same product, namely the product associated with product identification code Prod4, at the store location associated with location identification code Loc3 on the day associated with date identification code Day2 for a price of $3.47 represented in the second row of data table 100 (as opposed to the aforementioned $4.12) may be attributable to a promotional event at that location on that day or due to an individual pricing at that store location, for example. The "price" measure thus represents a measure of a real life event that cannot necessarily be quantified ahead of time, hence the name "measure."

Figure 2:
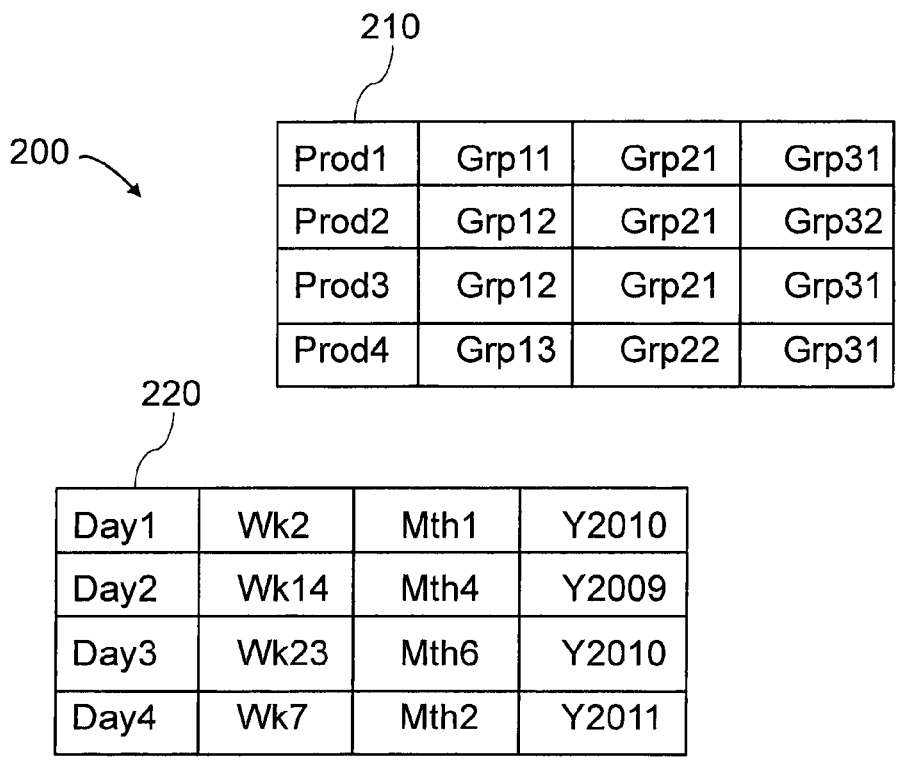
FIG. 2 schematically shows hierarchy information in accordance with an embodiment.

FIG. 2 schematically shows hierarchy information 200 in accordance with an embodiment.

In the illustrated embodiment, hierarchy information 200 includes a dimension table 210 and a dimension table 220. Although dimension tables 210, 220 are shown as including just four columns and four rows, a dimension table in accordance with an embodiment may comprise any number of columns and rows.

Dimension table 210 is shown as including a column of product identification codes, namely Prod1, Prod2, Prod3 and Prod4, and three columns of data representative of groupings of the product identification codes. Prod1 is shown as belonging to group Grp11 in a first hierarchy, to group Grp21 in a second hierarchy and to group Grp31 in a third hierarchy. Prod2 is shown as belonging to group Grp12 in the first hierarchy, to group Grp21 in the second hierarchy and to group Grp32 in the third hierarchy. Prod3 is shown as belonging to group Grp12 in the first hierarchy, to group Grp21 in the second hierarchy and to group Grp31 in the third hierarchy. Prod4 is shown as belonging to group Grp13 in the first hierarchy, to group Grp22 in the second hierarchy and to group Grp31 in the third hierarchy.

Dimension table 220 is shown as comprising a column of date identification codes, namely Day1, Day2, Day3 and Day4, and three columns of data representative of groupings of the date identification codes. Day1 is shown as belonging to group Wk2 in a first hierarchy (e.g., weeks), to group Mth1 in a second hierarchy (e.g., months) and to group Y2010 in another hierarchy level of the second hierarchy (e.g., years). Day2 is shown as belonging to group Wk14 in the first hierarchy, to group Mth4 in the second hierarchy and to group Y2009 in another hierarchy level of the second hierarchy. Day3 is shown as belonging to group Wk23 in the first hierarchy, to group Mth6 in the second hierarchy and to group Y2010 in another hierarchy level of the second hierarchy. Day4 is shown as belonging to group Wk7 in the first hierarchy, to group Mth2 in the second hierarchy and to group Y2011 in another hierarchy level of the second hierarchy.

The product identification codes in dimension table 210 may be used, as shown in FIG. 1, to represent products in data table 100. Similarly, the date identification codes in dimension table 220 may be used, as shown in FIG. 1, to represent dates in data table 100.

Figure 3:
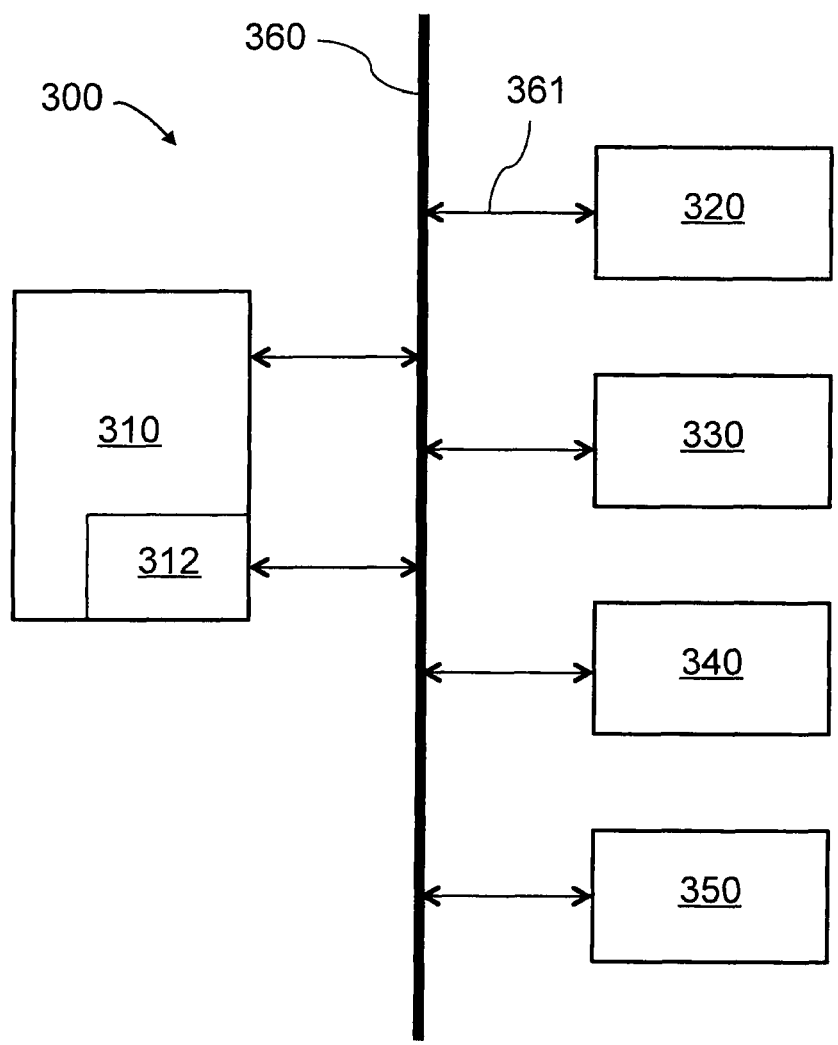
FIG. 3 schematically shows a system for data processing in accordance with an embodiment.

FIG. 3 schematically shows a system 300 for data processing in accordance with an embodiment.

In the illustrated embodiment, system 300 comprises a graphical user interface 310 comprising a user input receiving component 312. System 300 moreover comprises a simple filter object creation component 320, a filtered operation object creation component 330, a compound filter object creation component 340, a grouping component 350 and a communication bus 360 comprising a plurality of communication links 361 (for the sake of legibility, only one of the communication links bears a reference sign). Communication bus 360 and the communication links 361 communicatively interconnect the aforementioned components 320-350 and the graphical user interface 310.

Figure 4:
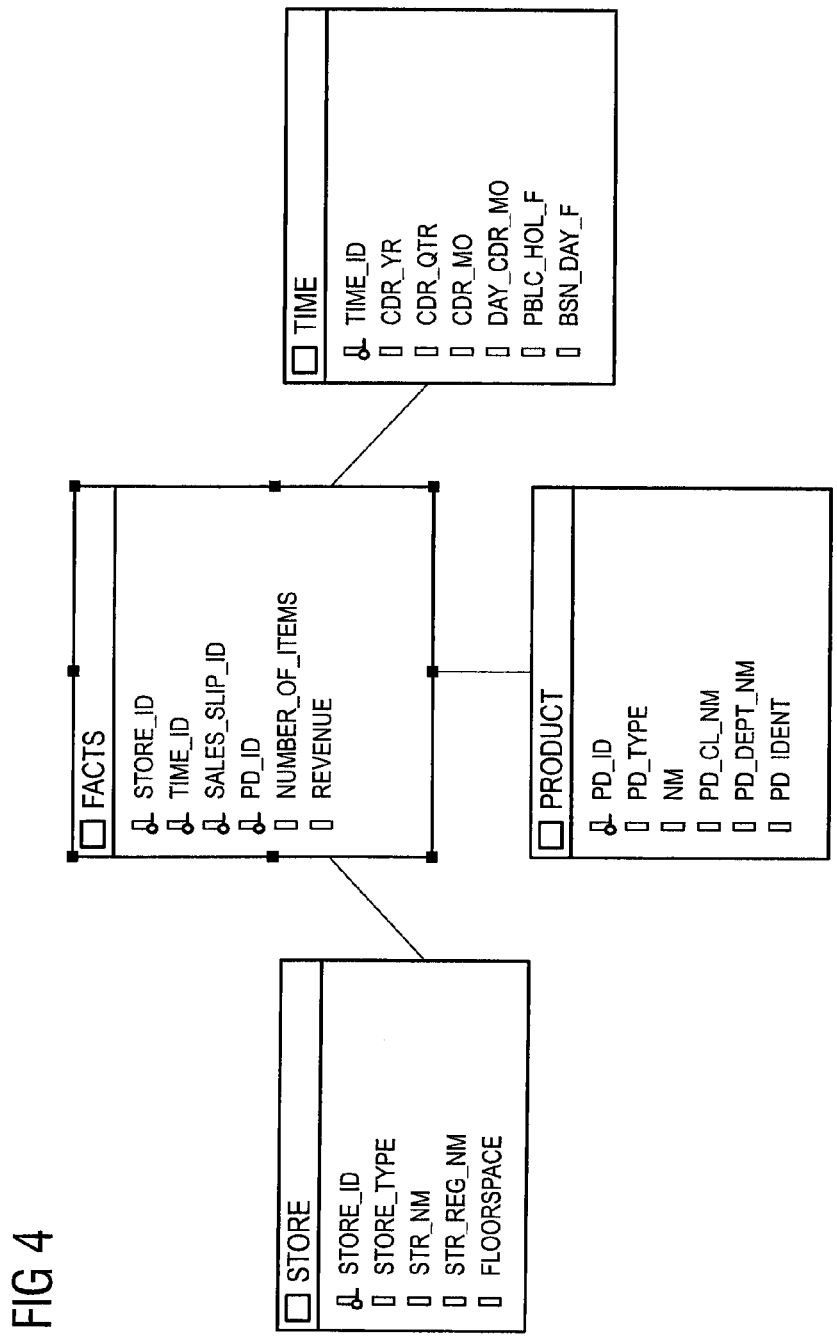
FIG. 4 schematically shows an extract of the relevant data structures of an exemplary data processing scenario in accordance with an embodiment.

An exemplary embodiment will now be described with reference to FIGS. 4 to 12. FIG. 4 schematically shows an extract of the relevant data structures of an exemplary data processing scenario in accordance with an embodiment. FIG. 5 shows a result table of the exemplary data processing scenario shown in FIG. 4. FIGS. 6 to 12 schematically show, based on the exemplary data processing scenario shown in FIG. 4, mocked-up screenshots of a user interface of a system for data processing in accordance with the an embodiment. The illustrated example presumes the following, hypothetical scenario:

A chain of retail stores arranges promotion events to attract new customers and intensify the existing customer relationship. One of these promotion events took place in selected stores of the chain on a weekend in June 2010 (Sat 12/Sun 13). The stores offered free drinks and several activities for the customers. In addition they allowed a discount on three selected products. A few weeks later the store chain wants to analyze how the promotion event affected revenue and transactions of the stores. To get this information they want to compare measures like the total revenue, the number of transactions and the total number of sold items on the special weekend to the weekends before and after the event. They compute the measures for each store to be able to compare also stores where the event took place to stores without a promotion event. They also want to compare these measures for the group of discounted products with the same measures for their other products. FIG. 4 shows an extract of the relevant data structures of their data warehouse.

The measures to be calculated per store are:

| | | |
|---|---|---|
| SUM(REVENUE) | June 12th/13th | Promoted products |
| COUNT(DISTINCT SALES_SLIP_ID) | June 5th/6th | (IDs: 10130, 35233, 46342) |
| SUM(NUMBER_OF_ITEMS) | June 19th/20th | All/Other products* |

While "Other products" might be more useful from a business perspective, "All products" is used in this example for demonstrating both simple and compound filters.

The above list can be read as a combination of three aggregations with three intervals along the time dimension and two subsets along the product dimension. Accordingly, the result table for the aforementioned calculations contains 19 columns, the STORE_ID and one column for each combination of aggregation, time interval and product subset as shown in FIG. 5.

In data warehouses there is often a multidimensional online analytical processing (OLAP) model available. The OLAP model allows calculation of aggregations like the ones given above and allows drilling down into the dimensions (i.e., splitting of the aggregations to predefined levels). Typical levels for the time dimensions are calendar year, quarter, month and day (organized in a hierarchy) or day and week. Typical hierarchy levels for the product dimension are product class, product department, etc.

For an ad hoc analysis as described in the scenario above, appropriate hierarchy levels will not be present in the OLAP model. The required granularity and the ranges or subsets along the dimensions will vary for each scenario. Adapting or extending the OLAP model for each ad hoc analysis is not a solution for such scenarios, because changing the model is complex and laborious. Furthermore, OLAP models are valuable assets of a company and frequent changes of the models are undesirable. Adding particular features of one project will complicate the model for everyone else in the company.

The desired calculations can be achieved via the following exemplary embodiment.

The multidimensional model is extended with filter objects. Those filter objects can be created ad hoc and in a data-driven way. Aggregations can be associated with one or several filter objects. When computing the aggregations, only those rows of the data that pass the filter conditions are used for the computations.

An embodiment provides an easy way to combine several aggregations with several filters. The aggregations and the filters can be selected from a list and can be saved for later reuse. The solution of an embodiment also allows creation of groups of filters. The filters within a group are not applied at the same time. The groups can be used to group all filters on the time dimension expressing the weekend in one group and the product subsets in a second group. Selecting aggregations and filter groups creates a cross product of aggregation and applied filters. This grouping allows an easy handling of the multiplicative complexity of applying filters along several dimensions.

Figure 6:
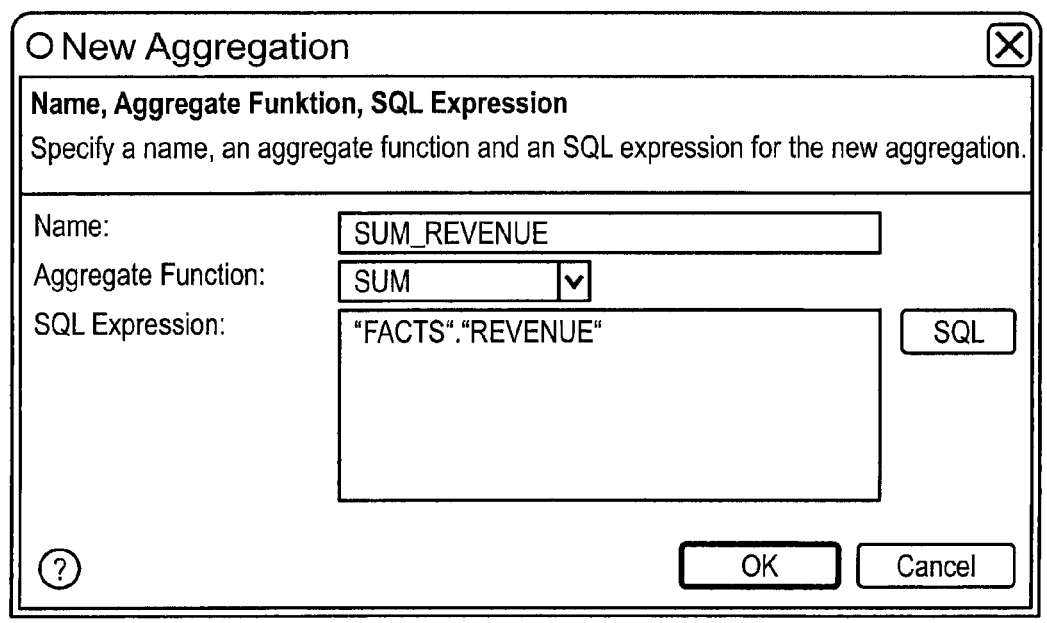
FIG. 6 schematically shows, based on the exemplary data processing scenario shown in FIG. 4, a mocked-up screenshot of a user interface of a system for data processing in accordance with an embodiment.

The sales measures that need to be analyzed for each individual store—revenue, number of transactions, number of items sold—are represented by objects of type "aggregation." An aggregation is characterized by a name, an aggregation function and a structured query language (SQL) expression as shown in FIG. 6 that shows the definition of an aggregation. The focus of analysis, which is the individual stores in this example, is defined in advance and implicitly used as the level of aggregation.

In the present example, aggregations representing the sum of the revenue, the number of transactions and the total number of items sold at each individual store are needed. Such a list of aggregations can be as follows:

| Name | Aggregate Function | SQL Expression |
| --- | --- | --- |
| SUM_REVENUE | Sum | "FACTS"."REVENUE" |
| COUNT_SALES_SLIP_ID | Count | DISTINCT "FACTS"."SALES_SLIP_ID" |
| SUM_NUMBER_OF_ITEMS | Sum | "FACTS"."NUMBER_OF_ITEMS" |

The aggregations need to be filtered alongside a single entity when analyzing the revenue of all products on the promotion weekend and alongside multiple entities when analyzing the revenue of the promoted products on the promotion weekend. Therefore two types of filters can be used: simple and compound.

Simple filters are arranged in groups in such a way that each group contains the filters pertinent to a particular filtering entity. In the present example, simple filters within a group cannot be applied simultaneously to aggregations; however, they can be combined with simple filters from other groups, resulting in a compound filter that can be applied to aggregations.

Figure 7:
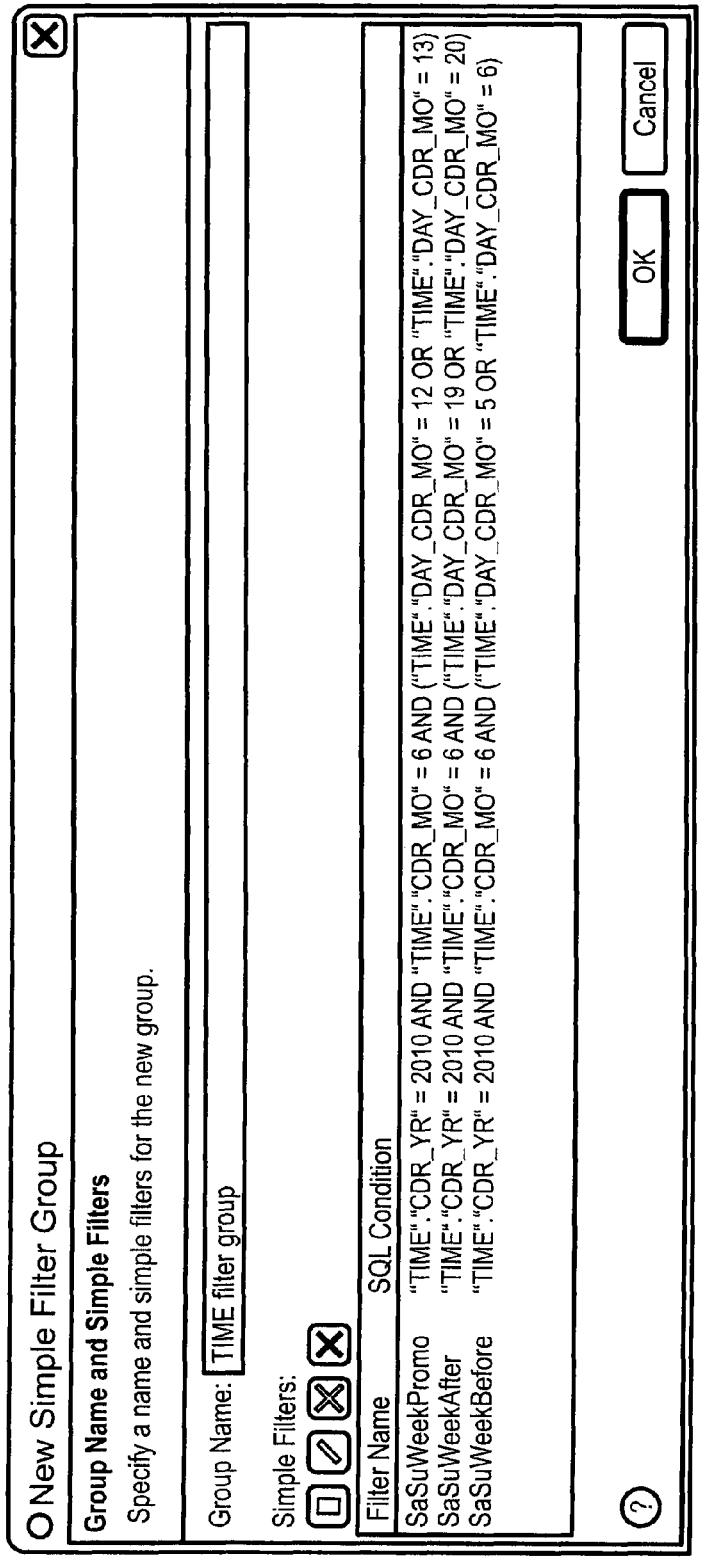

Each simple filter group is characterized by a name and a list of simple filters as shown in FIG. 7 that shows the definition of a simple filter group.

Figure 8:
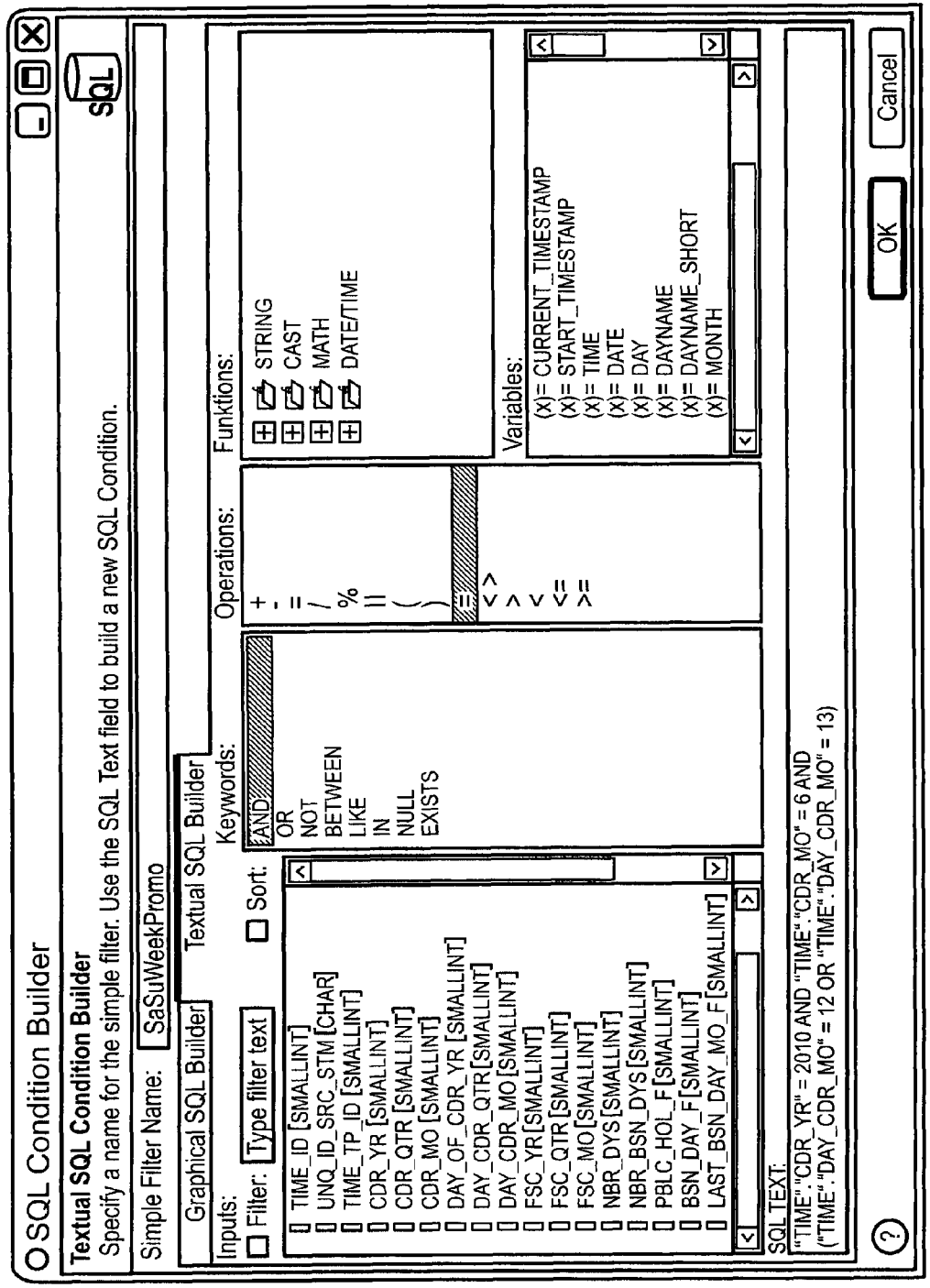
Figure 10A:
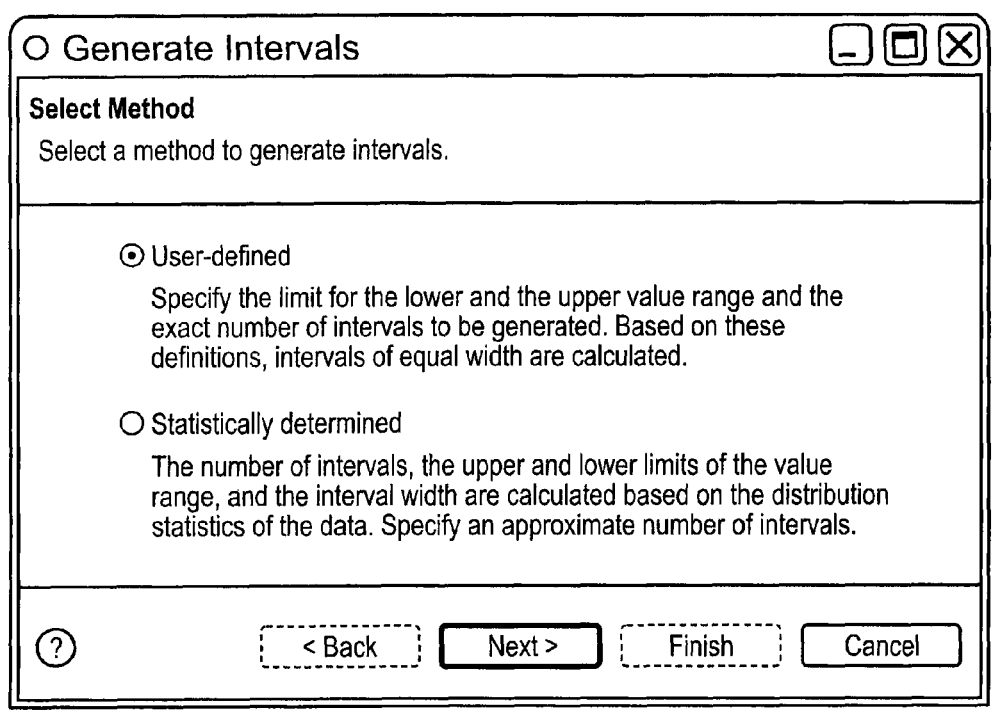
FIGS. 10a to 10c schematically show, based on the exemplary data processing scenario shown in FIG. 4, additional mocked-up screenshots of the user interface of a system for data processing shown in FIG. 6 in accordance with an embodiment.
Figure 10B:
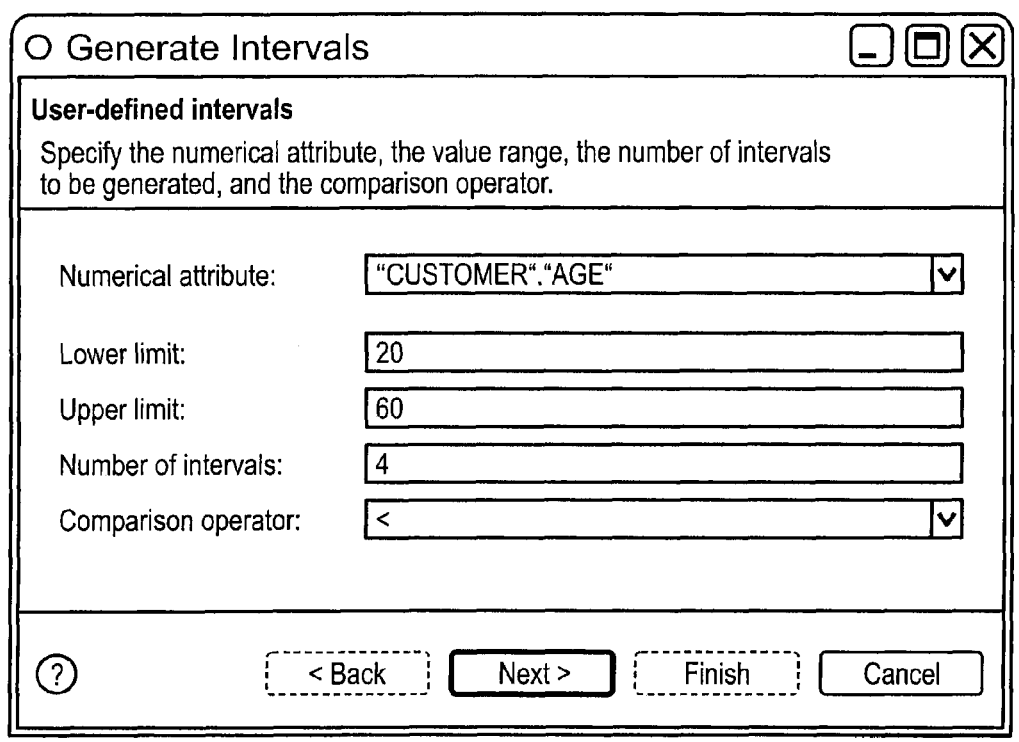
Figure 10C:
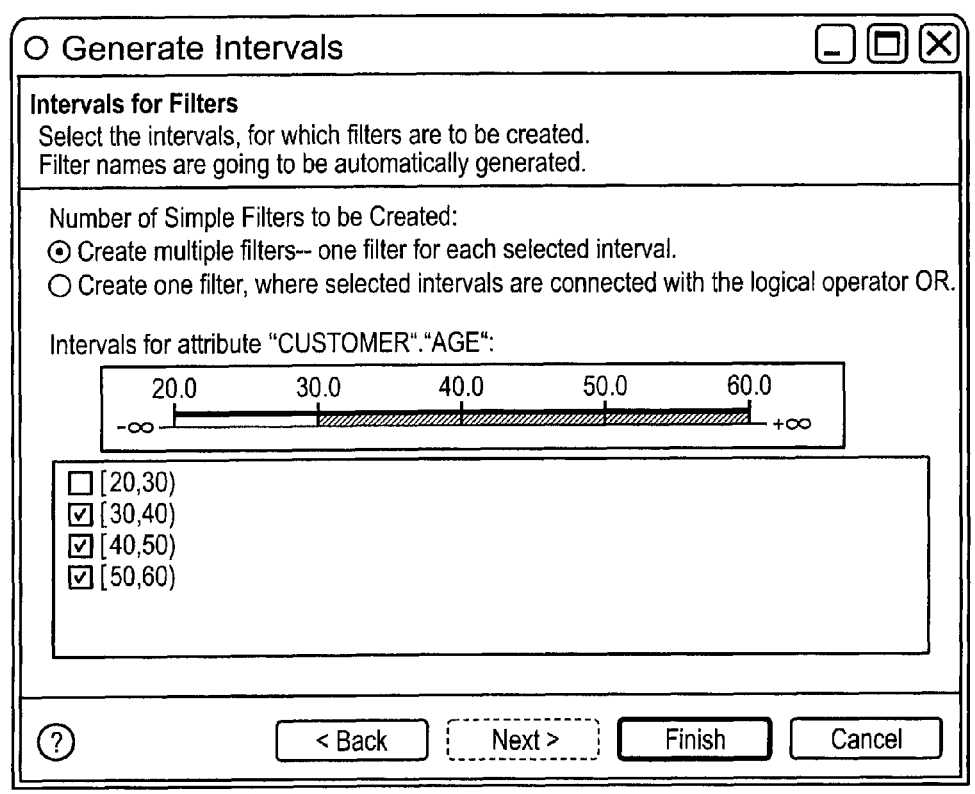

Each simple filter within these groups is characterized by a name and an SQL condition. Simple filters can be created in a variety of ad-hoc and data-driven ways:

- By exploring the multivariate distribution of the attribute values of a particular table and visually selecting the values of interest. An SQL condition is automatically built based on the selected attribute values or value ranges.
- By writing an SQL condition as shown in FIG. 8 that shows the definition of a simple filter with the Textual SQL Condition Builder.
- By reading the values of one or more attributes from the database, and selecting the values or combinations of values, for which filters are to be created as shown in FIG. 9. The values within a value combination are connected with the logical operator AND behind the scenes. There is a possibility to create multiple filters, one for each selected value or value combination, or only one filter where all selected values or value combinations are connected to each other with the logical operator OR.
- By discretizing continuous attribute values using intervals that can be either user-defined or statistically determined as shown in FIGS. 10a to 10c. There is a possibility to create multiple filters, one for each selected interval, or only one filter where all intervals of interest are connected with the logical operator OR.

In the present example, two groups of simple filters are needed.

- A group that contains simple filters pertaining to time, namely filters that represent the weekend of the promotion week, the weekend of the week before, and the weekend of the week after.
- A group that contains simple filters pertaining to products, namely a filter that represents the promoted products with IDs 10130, 35233, 46342.

Such a list of simple filter groups can be as follows:

| Group Name | Simple Filters |
| --- | --- |
| TIME filter group | SaSuWeekPromo, SaSuWeekAfter, SaSuWeekBefore |
| PRODUCT filter group | PromoProducts |

Figure 11A:
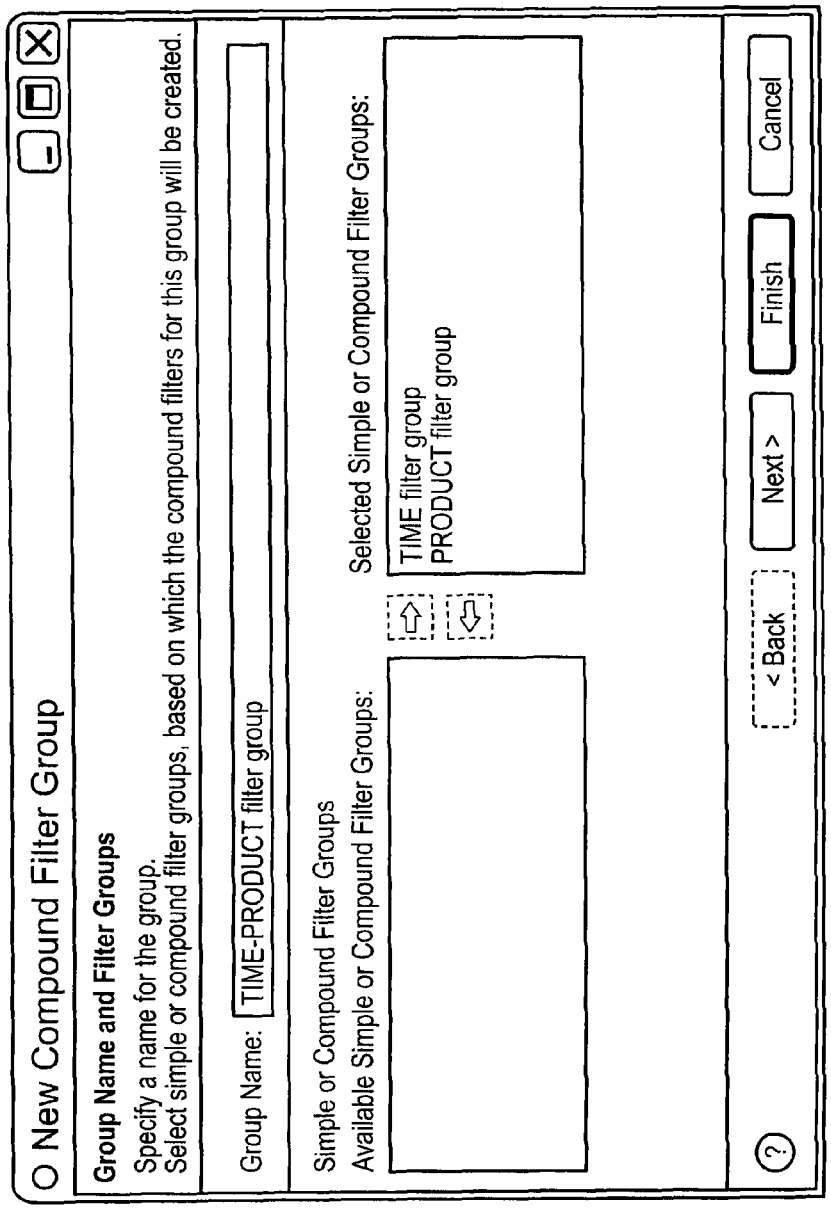

The groups of simple filters can be combined, resulting in a group of compound filters built by the cross product of the simple filter groups. Each compound filter group is characterized by a name and a list of compound filters that are created by the cross product of other simple and/or compound filter groups as shown in FIGS. 11a and 11b, each of which shows the definition of a compound filter group.

In the present example, one group of compound filters that are pertinent to both time and products, i.e., representing the promoted products on the weekends of the promotion week, the week before, and the week after, respectively, is needed. Such a list of compound filter groups can be as follows:

| Group Name | Compound Filters |
| --- | --- |
| TIME-PRODUCT filter group | SaSuWeekPromo-PromoProducts, SaSuWeekAfter-PromoProducts, SaSuWeekBefore-PromoProducts |

Figure 12A:
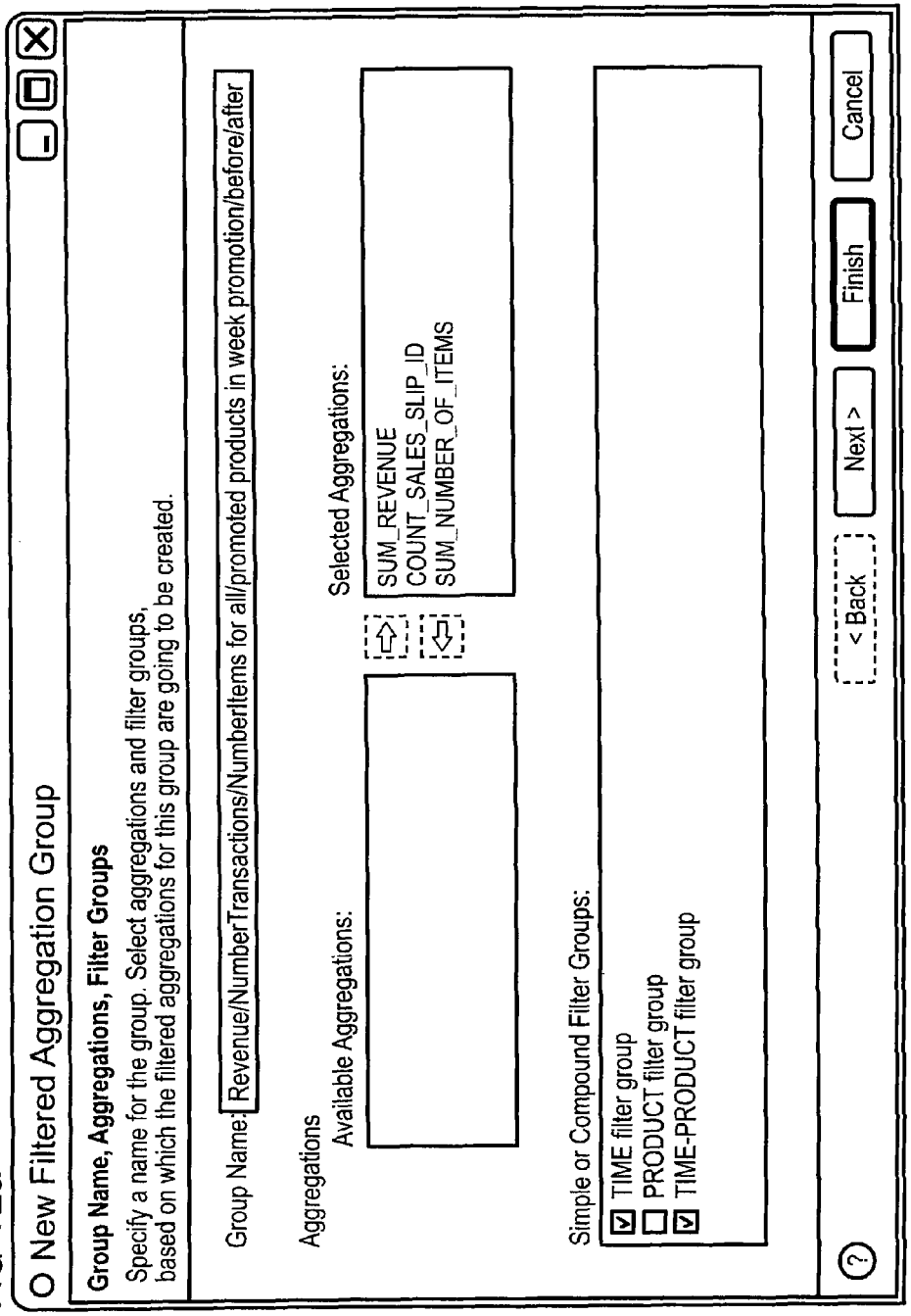

Multiple simple or compound filter groups can be easily applied to multiple aggregations in a so-called filtered aggregation group. As shown in FIGS. 12a and 12b, each of which shows the definition of a filtered aggregation group, each filtered aggregation group is defined by a name, a list of aggregations and a list of simple or compound filter groups, based on which the filtered aggregations of this group are created. Applying one filter group to one aggregation means that all M filters of the group are applied to the aggregation, resulting in M filtered aggregations. Applying N filter groups, each having M filters, to K aggregations, results in N*M*K filtered aggregations.

In the present example, the group of simple filters, representing the weekends of the promotion week, week before and week after, respectively, and the group of compound filters, representing the promoted products on the weekends of the promotion week, week before and week after, respectively, need to be applied to the three aggregations representing the revenue, number of transactions and number of items.

The resulting group of 18 filtered aggregations helps to analyze and compare the sales-related measures (revenue, number of transactions, number of items sold) of each individual store on particular dates (all products on the weekend of the promotion week, week before and week after, respectively) and on particular dates and particular products (only promoted products on the weekend of the promotion week, week before and week after, respectively).

An embodiment employs a concept of simple filter objects. A simple filter object may define an ad hoc subset of data in a single column (i.e., a subset of a particular dimension or measure) of a data table, such as a fact table, of the data warehouse. The ad hoc subsets defined by the simple filter objects may be distinct from any hierarchies defined by the data warehouse, or for example, defined in a dimension table of the data warehouse. Such a predetermined hierarchy could be data indicating days that can be grouped as weekends, weeks, months or years. Likewise, a predetermined hierarchy could be data indicating that particular product identification codes can be categorized into beverage categories such as soft drinks, alcoholic drinks, fruit juices, etc. and that beverages, cereals and frozen meals belong to the category "foodstuffs" whereas detergent, mops and sponges belong to the category "cleaning goods." Such hierarchies are often static and can thus be implemented into a logical structure of data in the data warehouse. In contrast, an ad hoc subset could be "winter holidays," e.g., data (of a dimension "date") in a data table corresponding to Thanksgiving, Christmas Eve, Christmas Day, New Year's Eve and New Year's Day of a given winter season.

According to an embodiment the ad hoc subset may be a subset of data in a single column of the data table. As such, the ad hoc subset of data may specify a subset of rows (i.e., records) in the data table, namely the subset of all rows in the data table having, in a given column of the data table, a data value belonging to the ad hoc subset. The ad hoc subset can thus act as a set of keys that specify a set of records in the data table.

An embodiment moreover employs a concept of filtered operation objects. A filtered operation object may specify an operation and at least one ad hoc subset. Building upon the concept that each ad hoc subset can be understood as defining a set of records in the data table, a filtered operation object can specify an operation to be carried out on a set of records in the data table. In the case of a set of sales transactions, for example, the operation may be summing the sales price of the individual sales transactions belonging to the set.

In accordance with another embodiment, a concept of compound filter objects is disclosed. A compound filter object may specify at least two simple filter objects. Each of the simple filter objects may define a subset of a different dimension/measure. For example, one of the simple filter objects of a compound filter object may define a subset of dimension "date," whereas another simple filter object of the compound filter object may define a subset of dimension "location," and another simple filter object of the compound filter object may define a subset of measure "price." The compound filter object may specify how the sets of records defined by the simple filter objects specified by the compound filter object are to be combined into a single set of records. For example, the compound filter object may define a set of records containing only the records in the data table that belong to the intersection of the sets of records defined by the simple filter objects specified by the compound filter object. Similarly, the compound filter object may specify that the sets of records are to be merged, i.e., that the compound filter object defines a set of records equal to the union of the sets of records defined by the simple filter objects specified by the compound filter object. Similarly, the compound filter object may define a set of records that is any combination of intersections and/or unions of the sets of records defined by the simple filter objects specified by the compound filter object.

According to an embodiment, a compound filter object may be used to specify a plurality of ad hoc subsets in a filtered operation object. In other words, a filtered operation object can specify an operation to be carried out on the set of records defined by the compound filter object. As a result, a user can easily specify complex operations. For example, a user can create a first simple filter object with regard to the "date" dimension that defines a set of records associated with a weekend on which a promotional event took place at one store location, a second simple filter object with regard to the "location" dimension that defines a set of records associated with the store location at which the promotional event took place and a third simple filter object with regard to the "date" dimension that defines a set of records associated with a later weekend on which promotional events were held at all store locations. The compound filter object may be defined that specifies a union of the set of records defined by the third simple filter object with a set of records equal to the intersection of the sets of records defined by the first and second simple filter objects. By performing a count operation on the set of records defined by the compound filter object, the user can easily total the transactions that occurred at the same time and place as the promotional events.

An embodiment may comprise receiving a user input that specifies at least one variable and at least one operation of a relation/an equation with which a simple filter object defines the respective ad hoc subset. On the one hand, this allows the user unprecedented flexibility in defining the simple filter object. On the other hand, if the simple filter object relates to only one dimension/measure, the complexity of the relation/equation is limited so as to not overwhelm the user.

An embodiment relates to processing data of a database environment, the database environment may comprise at least one data table, e.g., a so-called fact table. The data table may have the (logical) form of a two or higher dimensional array of values in the form of a matrix. To the respect that the present disclosure speaks of a "column" or a "row" of a data table, a column/row can be understood as a collection of values obtained by stepping through the full range of any one index of the array, and a row can be understood as a collection of values obtained by stepping through the full range of any one other index of the array. In other words, the terms "column" and "row" can be understood as designating orthogonal collections of values in the array. A row of values may represent a record of data, e.g., data associated with an individual sales transaction or an individual customer. A column may contain values representative of a respective aspect of the records of data, e.g., the date or location of the individual sales transactions in the case of sales transaction records or a customer ID, name and address of the individual customers in the case of customer records.

The database environment of an embodiment may comprise hierarchy information, e.g., one or more so-called dimension tables that define one or more finite sets of values. Having regard for the finiteness of the set, i.e., the individuality of the values, the values can also be termed "identification codes." The hierarchy information may define one or more groups of identification codes, each of the identification codes in any one group belonging to a respective one of the sets of identification codes. The hierarchy information may, in a hierarchical fashion, define one or more groups of the groups of identification codes of a respective set, groups of the groups of groups of identification codes of a respective set, etc. In other words, the hierarchy information may define levels of hierarchy. The identification codes in a respective set may constitute the lowest level of hierarchy. A group of identification codes from a respective set may constitute the next highest level of hierarchy, etc. The hierarchy information may classify each of the identification codes in a respective set into a respective group at each level of hierarchy defined by the hierarchy information. In other words, the groups defined at a given level of hierarchy from a respective set of identification codes may define mutually exclusive, i.e., non-overlapping, sets of identification codes.

For example, the hierarchy information may comprise a set of product identification codes and a set of store identification codes. The hierarchy information may define, from the set of product identification codes, a group of product identification codes designated as "soft drinks" and another (mutually exclusive) group of product identification codes designated as "fruit juices." The hierarchy information may define a group designated "beverages" that includes the groups "soft drinks" and "fruit juices" and a group designated "foodstuffs" that includes the group "beverages." From the set of store identification codes, the hierarchy information may define a group of store identification codes designated as "Minneapolis stores" and another (mutually exclusive) group of store identification codes designated as "Chicago stores." The hierarchy information may define a group designated "Midwest stores" that includes the groups "Minneapolis stores" and "Chicago stores" and a group designated "US stores" that includes the group "Midwest stores."

The hierarchy information of an embodiment may have the logical structure of a matrix. The matrix may comprise a column containing identification codes, another column specifying groups at a first level of hierarchy, another column specifying groups at a second level of hierarchy, etc. For example, the matrix may comprise a first column consisting of all of the identification codes belonging to a respective one of the aforementioned sets of identification codes, a second column specifying, for each row in the matrix, a group at a first level of hierarchy to which the identification code in the respective row belongs, a third column specifying, for each row in the matrix, a group at a second level of hierarchy to which the group at a first level of hierarchy specified in the respective row belongs, etc.

The hierarchy information of an embodiment may comprise parallel levels of hierarchy. In other words, (each of the) identification codes of a set of identification codes may be classified into a respective group of a set of groups belonging to a given level of hierarchy of one hierarchy and into a respective group of a set of groups belonging to the same level of hierarchy of another hierarchy. For example, identification codes representative of a date may be hierarchically grouped as follows:

day→week
day→month→quarter→year
day→Chinese lunar month→Chinese year

Accordingly, the matrix of an embodiment may contain additional columns for the groups of the parallel levels of hierarchy.

The hierarchy information of an embodiment may comprise, for one or more or all of the identification codes and/or for one or more or all of the groups of identification codes in/at one or more or all of the hierarchies/levels of hierarchy, a value associated with each respective identification code/group. For example, an identification code representative of a store location could have an associated value representative of the floor space or the name of the store location. Similarly, the aforementioned group representative of "Midwest stores" could have an associated value representative of the total number of employees employed by the store locations belonging to that group. Accordingly, the matrix may contain additional columns for such associated values.

The data table of an embodiment may comprise at least one column where, for each of the columns, each value in the respective one of the columns belongs to a respective one of the sets of identification codes defined by the hierarchy information. For example, a data table may comprise a column whose values all belong to a set of product identification codes defined by the hierarchy information. Similarly, the same data table may comprise a column whose values all belong to a set of date identification codes defined by the hierarchy information. Since the values in such columns are identification codes, the values may be termed "identification values." Such a column may be termed a "dimension." In the context of a data record, a value belonging to such a column may also be termed a "dimension."

The data table of an embodiment may comprise at least one column where, for each of the columns, each value in the respective one of the columns is selected from an essentially continuous range of values. Such a column may be termed a "measure." In the context of a data record, a value belonging to such a column may also be termed a measure value or just "measure." The values in the respective column may be essentially unrelated to the values/identification codes in the hierarchy information. The values in the respective column may have the characteristic of having no more correlation to values/identification codes in the hierarchy information than to a random selection of values chosen from the range of values in the column. For example, a data table may comprise a column whose values represent the total price associated with a sales transaction. Such values often exhibit a Gaussian distribution.

An embodiment may comprise generating at least one simple filter object. The simple filter object may define an ad hoc group of identification codes selected from any one of the sets of identification codes. In other words, a simple filter object may define an ad hoc subset of a set of identification codes defined by the hierarchy information. As such, a simple filter object may define an ad hoc subset of a dimension of a data table. Accordingly, the simple filter object may comprise information identifying a data table to which the simple filter object applies.

According to an embodiment, a simple filter object may be defined, for example, via reference to one or more identification codes, one or more groups of identification codes (at any level of hierarchy) and/or one or more of the values (in the hierarchy information) associated with the identification codes/groups of identification codes.

The set of identification codes from which the ad hoc group defined by the simple filter object is selected may be termed the "dimension" of the simple filter object. The generating of a simple filter object may comprise receiving a user input, on the basis of which user input the simple filter object defines the ad hoc group/subset. For example, the method may comprise receiving a user input that individually specifies identification codes to be included in the ad hoc subset and/or specifies one or more criteria that allow the ad hoc group to be distinguished from other identification codes in the set or from other identification codes in the column.

The ad hoc group of identification codes defined by the simple filter object may differ from each group of identification codes, group of groups of identification codes, etc. defined by the hierarchy information. In other words, the ad hoc group of identification codes may differ from each group of identification codes defined (regardless of the level of hierarchy) in the hierarchy information.

The simple filter object of an embodiment may be an instance of a data structure. Accordingly, the generating of a simple filter object may comprise creating an instance of such a data structure. The data structure may contain one or more criteria that allow the ad hoc group to be distinguished from, for example, other identification codes in the set that define the ad hoc group. Similarly, the data structure may define the ad hoc group by containing a reference to those identification codes that belong to the ad hoc group.

The simple filter object of an embodiment may, additionally or alternatively, define an ad hoc group of measures/measure values selected from any one column of measures.

Accordingly, an embodiment may comprise receiving a user input that individually specifies measure values to be included in the ad hoc subset and/or specifies one or more criteria that allow the ad hoc group to be distinguished from other measure values in the respective column. Furthermore, the aforementioned data structure may likewise contain one or more criteria that allow the ad hoc group to be distinguished from other measure values in the respective column that define the ad hoc group. Similarly, the data structure may define the ad hoc group by containing a reference to those measure values that belong to the ad hoc group. The column from which the ad hoc group defined by the simple filter object is selected may be termed the "measure" of the simple filter object.

The simple filter object of an embodiment may comprise a relation/an equation that defines the ad hoc group of identification codes/measure values. Accordingly, the user input may specify at least one variable and/or at least one operation of the relation/equation that defines the ad hoc group. In this respect, the receiving of a user input may comprise allowing a user to select variables and/or operations via a graphical user interface. This may include allowing a user to select a column in the data table or to select a set of identification codes in the hierarchy information and presenting the user with a set of variables and/or operations appropriate for defining an ad hoc group based on the data type of the values contained in the selected column/set. In other words, the receiving of user input may comprise allowing a user to select any one of a column in the data table and a set of identification codes in the hierarchy information and modifying a list of variables and/or operations presented to the user (via a graphical user interface) based on the data type of the values in the selected column/set.

The simple filter object of an embodiment may comprise name information. Accordingly, an embodiment may comprise receiving a user input that at least partially specifies the name information for the simple filter object. In the example cited above, the name information could be "Winter_holidays" to make it simple for a user to recognize what the ad hoc subset defined by the simple filter object represents in "real life" terms.

An embodiment may comprise generating at least one filtered operation object that specifies an operation and at least one of the simple filter objects. The generating of a filtered operation object may comprise receiving a user input, on the basis of which user input the filtered operation object defines the operation and/or one or more or all of the at least one simple filter objects. The filtered operation object may be an instance of a data structure. Accordingly, the generating of a filtered operation object may comprise creating an instance of such a data structure.

The filtered operation object of an embodiment may comprise name information. Accordingly, an embodiment may comprise receiving a user input that at least partially specifies the name information for the filtered operation object. If, continuing with the example cited above, the filtered operation object were to specify an operation of counting the number of transactions, the name information could be "Count_transactions_winter_holidays" to make it simple for a user to recognize what the filtered operation object represents in "real life" terms.

In its definition of an ad hoc group of values (namely identification codes/measures), the simple filter object of an embodiment defines a set of data records in the data table, namely the set of data records having a value in the column corresponding to the dimension/measure of the simple filter object that belongs to the ad hoc group. In cases where a filtered operation object only specifies one simple filter object, the filtered operation object may thus be understood as specifying an operation to be carried out on the set of data records defined by the simple filter object specified by the filtered operation object. The case where a filtered operation object specifies a plurality of simple filter objects will be further discussed below.

An embodiment may comprise generating a compound filter object that specifies at least two simple filter objects as described above. The dimension/measure of each of the simple filter objects specified by the compound filter object may differ from the dimension/measure of one or more or all of the other simple filter objects specified by the compound filter object. Just as a simple filter object defines a set of data records in the data table, the compound filter object may define a set of data records in the data table. As touched upon above, the compound filter object may specify how the sets of records defined by the ad hoc groups defined by the simple filter objects specified by the compound filter object are to be combined to define a (single) set of records. For example, the compound filter object may define a set of records containing only the records in the data table that belong to the intersection of the sets of records defined by the ad hoc groups defined by the simple filter objects specified by the compound filter object. Similarly, the compound filter object may specify that the sets of records are to be merged, that is, the compound filter object defines a set of records equal to the union of the sets of records defined by the ad hoc groups defined by the simple filter objects specified by the compound filter object. Similarly, the compound filter object may define a set of records that is any combination of intersections and/or unions of the sets of records defined by the ad hoc groups defined by the simple filter objects specified by the compound filter object.

Just as a compound filter object may specify a simple filter object, a compound filter object may specify another compound filter object according to an embodiment. Accordingly, a compound filter object may specify any combination of simple filter objects and other compound filter objects. As above, the compound filter object may specify how the sets of records defined by the combination of simple filter objects and other compound filter objects specified by the compound filter object are to be combined to define a (single) set of records.

A filtered operation object of an embodiment may specify a plurality of simple filter objects by specifying a compound filter object. In such a case, the filtered operation object may thus be understood as specifying an operation to be carried out on the set of data records defined by the compound filter object specified by the filtered operation object.

An embodiment may comprise automatically grouping at least two of the simple filter objects by dimension/measure, that is, automatically creating groups of simple filter objects (simple filter groups) by dimension/measure. In other words, the method may comprise automatically grouping the simple filter objects such that, for each of the resultant simple filter groups, the set of identification codes from which the ad hoc group of identification codes defined by any simple filter object of the respective group is selected is identical to the set of identification codes from which the ad hoc group of identification codes defined by any other simple filter object of the respective group is selected. The method may furthermore comprise presenting the simple filter objects to a user by groups, i.e., as automatically grouped. This allows a user to readily recognize which simple filter objects have been generated for each dimension/measure.

An embodiment may comprise allowing a user to select a set of simple filter objects from any of the automatically created simple filter groups and automatically generating a compound filter group defining a set of compound filters objects equal to the set of all possible combinations of the selected set of filtered objects limited to one simple filter object per each of the dimensions/measures associated with the selected set of simple filter objects, each of the compound filter objects defining the set of records equal to the intersection of the sets of records defined by the simple filter objects in the respective combination. This allows a user to quickly generate a large number of data sets for analysis based on a few simple filter objects.

An embodiment may comprise allowing a user to select a set of operations, each of which is to be affected on the individual sets of records defined by the compound filters belonging to the compound filter group. This allows a user to quickly define batch processing of the generated data sets.

An embodiment may comprise executable data transformation code based on the filtered operation object. For example, an embodiment may comprise generating, based on a filtered operation object, executable data transformation code that, when executed on a computer, determines rows of the data table that, for each of the simple filter objects specified by the filtered operation object, contain an identification code belonging to the ad hoc group defined by the respective simple filter object and effects the operation specified by the filtered operation object on the determined rows. By generating executable data transformation code from the filtered operation object, it becomes possible to process large amounts of data swiftly, yet without reprogramming/restructuring the database environment.

While the teachings of the present disclosure have been discussed hereinabove mainly in the form of a method, the teachings may be embodied, in the form of a system for processing data of a data warehouse, or a computer program product. The system of an embodiment may be configured and adapted to affect any of the actions described above with respect to the disclosed method. The system may comprise user input receiving component that receives user inputs, a graphical user interface that may comprise the user input receiving component, a simple filter object creation component that creates simple filter objects, a filtered operation object creation component that creates filtered operation objects, a compound filter object creation component that creates compound filter objects, and a grouping component that groups simple filter objects. The data warehouse of an embodiment may comprise one or more fact tables and/or dimension tables. The system may comprise the fact tables and/or the dimension tables.

Any of the aforementioned components of the system communicate with any other of the aforementioned components of the system and/or the fact tables and/or the dimension tables. In this respect, the system of an embodiment may comprise one or more communication busses/links interconnecting the respective component(s)/table(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The block diagrams in the Figures illustrate the architecture, functionality, and operation of possible implementations of systems, methods and computer program products according to various embodiments of the present disclosure. In this regard, each block in the block diagrams may represent a module, segment, or portion of code, which comprises one or more executable instructions for implementing the specified logical function(s). It should also be noted that, in some alternative implementations, the functions discussed hereinabove may occur out of the disclosed order. For example, two functions taught in succession may, in fact, be executed substantially concurrently, or the functions may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In the present disclosure, the verb "may" is used to designate optionality/noncompulsory. In other words, something that "may" can, but need not.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method of processing data of a data warehouse, comprising:
   receiving, by a processing device, a user input to create simple filter objects, each simple filter object defining a first ad hoc subset of a respective dimension of a dimension table of said data warehouse each said first ad hoc subset is different from subsets defined by said dimension table;
   generating the simple filter objects based on the user input;
   generating a first compound filter object, the first compound filter object defining a second ad hoc subset of dimensions from a plurality of dimension tables of said data warehouse, the first compound filter object generated by combining at least two of the plurality of simple filter objects;
   generating a second compound filter object, the second compound filter object defining a third ad hoc subset of dimensions from a plurality of dimension tables of said data warehouse, the second compound filter object generated by combining the first compound filter object and at least one of the plurality of simple filter objects, wherein at least a subset of the third ad hoc subset of dimensions are selected based on exactly one dimension and at least a subset of the third ad hoc subset of dimensions are selected based on at least two of said dimensions;
   receiving a user input to create a filtered operation object that specifies an operation and the second compound filter object; and
   generating the filtered operation object based on receiving the user input to create the filtered operation object, wherein the filtered operation object when executed causes the operation to be carried out on a set of records in a data table corresponding to the third ad hoc subset of dimensions, thereby providing multi-dimensional ad hoc analysis of subsets of records in the data table that are not specified by dimension tables of said data warehouse.

2. The computer-implemented method of claim 1, wherein said user input specifies at least one variable and at least one operation of an equation with which one of said ad hoc subsets is defined.

3. The computer-implemented method of claim 1, comprising:
   automatically grouping said simple filter objects into simple filter groups by dimension.

4. The computer-implemented method of claim 1, wherein said data warehouse comprises a fact table having rows and columns of data including columns of dimension data and columns of measures, the data each respective column of dimension data belonging to a respective dimension of said dimension table, and said method further comprises:
   receiving a user input to create simple filter objects, each defining an ad hoc subset of a respective column of measures.

5. The computer-implemented method of claim 4, comprising:
   receiving a user input to create a compound filter object that specifies at least one of said simple filter objects defining an ad hoc subset of a respective dimension and specifies at least one of said simple filter objects defining an ad hoc subset of a respective column of measures.

6. The computer-implemented method of claim 1, further comprising:
processing data of a data warehouse, the data of the data warehouse comprising a fact table having rows and columns of data including columns of dimension data and columns of measures, the data each respective column of dimension data belonging to a respective dimension of a dimension table.

7. A system for processing data of a data warehouse, comprising:
a memory having computer readable instructions; and a processor for executing the computer readable instructions, the computer readable instruction including:
receiving, by a processing device, a user input to create simple filter objects, each simple filter object defining a first ad hoc subset of a respective dimension of a dimension table of said data warehouse each said first ad hoc subset is different from subsets defined by said dimension table;
generating the simple filter objects based on the user input;
generating a first compound filter object, the first compound filter object defining a second ad hoc subset of dimensions from a plurality of dimension tables of said data warehouse, the first compound filter object generated by combining at least two of the plurality of simple filter objects;
generating a second compound filter object, the second compound filter object defining a third ad hoc subset of dimensions from a plurality of dimension tables of said data warehouse, the second compound filter object generated by combining the first compound filter object and at least one of the plurality of simple filter objects, wherein at least a subset of the third ad hoc subset of dimensions are selected based on exactly one dimension and at least a subset of the third ad hoc subset of dimensions are selected based on at least two of said dimensions;
receiving a user input to create a filtered operation object that specifies an operation and the second compound filter object; and
generating the filtered operation object based on receiving the user input to create the filtered operation object, wherein the filtered operation object when executed causes the operation to be carried out on a set of records in a data table corresponding to the third ad hoc subset of dimensions, thereby providing multi-dimensional ad hoc analysis of subsets of records in the data table that are not specified by dimension tables of said data warehouse.

8. The system of claim 7, wherein said user input specifies at least one variable and at least one operation of an equation with which one of said ad hoc subsets is defined.

9. The system of claim 7, wherein the computer readable instructions further include:
automatically grouping said simple filter objects into simple filter groups by dimension.

10. The system of claim 7, wherein said data warehouse comprises a fact table having rows and columns of data including columns of dimension data and columns of measures, the data each respective column of dimension data belonging to a respective dimension of said dimension table, and
the computer readable instructions further include receiving a user input to create simple filter objects, each defining an ad hoc subset of a respective column of measures.

* * * * *